United States Patent
Gattavari et al.

(10) Patent No.: US 6,998,827 B2
(45) Date of Patent: Feb. 14, 2006

(54) SWITCHING VOLTAGE REGULATOR WITH NEGATIVE TEMPERATURE COMPENSATION

(75) Inventors: Giuseppe Gattavari, Busto Arsizio (IT); Raimondo Vai, Milan (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 68 days.

(21) Appl. No.: 10/722,376

(22) Filed: Nov. 25, 2003

(65) Prior Publication Data

US 2004/0150378 A1    Aug. 5, 2004

(30) Foreign Application Priority Data

Nov. 29, 2002   (EP) ................................. 02425737

(51) Int. Cl.
   *G05F 1/40* (2006.01)
(52) U.S. Cl. ..................................... 323/284; 323/272
(58) Field of Classification Search ............... 323/284, 323/272, 283, 285

See application file for complete search history.

(56) References Cited

U.S. PATENT DOCUMENTS

| 4,760,434 A | * | 7/1988 | Tsuzuki et al. ................ 257/49 |
| 4,791,349 A | * | 12/1988 | Minks ........................ 323/266 |
| 4,814,687 A | * | 3/1989 | Walker ........................ 323/275 |
| 5,723,974 A | | 3/1998 | Gray ........................... 323/282 |
| 5,990,669 A | | 11/1999 | Brown ......................... 323/282 |
| 6,456,050 B1 | | 9/2002 | Agiman ...................... 323/282 |
| 6,473,280 B1 | | 10/2002 | Buxton et al. ................ 361/18 |
| 6,765,372 B1 | * | 7/2004 | Isham ......................... 323/224 |

FOREIGN PATENT DOCUMENTS

| EP | 0 483 852 A2 | 5/1992 |
| EP | 0 896 417 A2 | 2/1999 |
| EP | 1 172 923 A1 | 1/2002 |

* cited by examiner

*Primary Examiner*—Shawn Riley
(74) *Attorney, Agent, or Firm*—Lisa K. Jorgenson; Robert Iannucci; Seed IP Law Group PLLC (57) ABSTRACT

A switching voltage regulator provides a regulated voltage at an output terminal. The switching voltage regulator includes a MOS transistor having a non-drivable terminal coupled with the output terminal and a control circuit receiving a signal that is representative of the current signal flowing in the MOS transistor. The control circuit includes a compensation device adapted for cancelling the thermal variation of the signal that is representative of the current signal flowing in the MOS transistor.

19 Claims, 8 Drawing Sheets

SWITCHING VOLTAGE REGULATOR WITH NEGATIVE TEMPERATURE COMPENSATION

TECHNICAL FIELD

The present invention refers to a switching voltage regulator.

BACKGROUND OF THE INVENTION

It is usually known the use of control circuits in switching static regulators employed in power suppliers wherein particular features on the precision of the regulation are requested, as in the power supply circuits of the high performance modern microprocessors. Particularly such power suppliers must provide higher and higher currents and lower and lower voltages.

Switching regulators are used to perform said power suppliers. Each regulator comprises at least one MOS power transistor; particularly some regulators comprise a pair of MOS transistors or several pairs of MOS transistors which are arranged in parallel to each others and which are connected with a single output terminal by means of an inductance for each transistor pair (Multi-phase converters). The output currents of said pairs of transistors are automatically balanced by means of a control operation which detects each single current by detecting the voltage drop between the drain and source terminals of the MOS transistor. This voltage drop is also employed for implementing a well precise and programmable load regulation as a function of the current provided to the load, as it is required from particular loads such as the microprocessors.

It is however known that the MOS transistors are provided internally of a resistance between the drain and source terminals in the conduction or firing phase, known as on or conduction resistance Rdson, which changes with the temperature and which, for this reason, can cause variations of the voltage signal between the drain and source terminals of the MOS transistor with currents of the same value. This occurs above all in the power MOS transistors because the current flowing through the source and drain terminals thereof is high and consequently the variation of the voltage drop at the terminals of the MOS transistor which is due to the thermal variation of the on resistance, is also high above all in the cases wherein, for size problems, thermal dissipators or fans are not used.

Therefore the thermal variation of the on resistance (Rdson) of the MOS may cause very high variations of the voltage regulated by the power suppliers which employ the voltage detected between the terminals of the MOS transistor for regulating the output voltage on the load to be supplied. This may bring to non-respect of some specifications of the loads such as the microprocessors.

A possibility to avoid the variations of the voltage detected between the terminals of the MOS transistor of the voltage regulators consists of adding and consequently using measurement elements that are substantially invariant in temperature, for example resistors known as "sense resistors". The signal measured between the terminals of the sense resistors acts in the control operation of the MOS transistor for regulating suitably the output voltage of the regulator. Such resistors have thermal variations lower than the resistance Rdson, are very precise but the high precision thereof is compromised by the high contact resistance due to the welding thereof on the printed circuit of the regulator. Also the power dissipated by the sense resistors decreases the effectiveness of all the regulator and the use thereof causes a higher cost of all the appliance.

In view of the art described, it is an object of the present invention to provide a switching voltage regulator that overcomes the aforementioned disadvantages.

SUMMARY OF THE INVENTION

According to principles of the present invention, a switching voltage regulator adapted for providing a regulated voltage at an output terminal, comprising at least one MOS transistor.

In one embodiment the MOS transistor includes a non-drivable terminal coupled with said output terminal and a control circuit receiving a signal that is representative of the current signal flowing in said MOS transistor, characterized in that said control circuit comprises a compensation device adapted for cancelling the thermal variation of said signal that is representative of the current signal flowing in said MOS transistor.

BRIEF DESCRIPTION OF THE DRAWINGS

The features and the advantages of the present invention will be made evident by the following detailed description of an embodiment thereof, illustrated as not limiting example in the annexed drawings, wherein.

DETAILED DESCRIPTION

Figure 1:
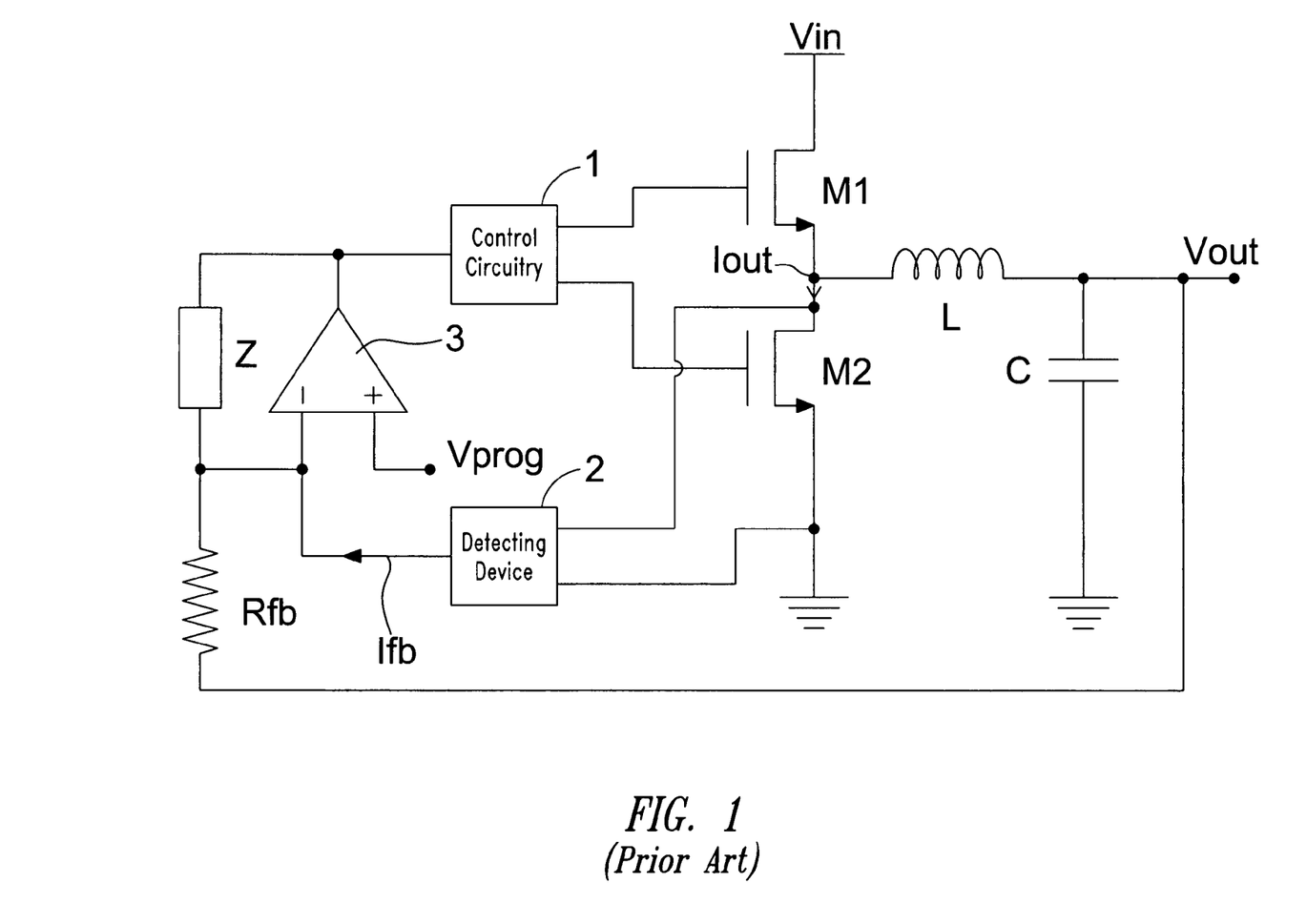
FIG. 1 is a simplified circuit scheme of a switching regulator according to prior art.

Referring to FIG. 1 a switching regulator according to the prior art is shown; said regulator comprises two MOS power transistors M1 and M2 where the source terminal of the transistor M1 is in common with the drain terminal of the transistor M2 and it is connected with an inductance L the other terminal of which is the output terminal of the regulator. The drain terminal of the transistor M1 is connected with an input voltage Vin while the source terminal of the transistor M2 is connected to ground. The gate terminals of the transistors M1 and M2 (which may constitute even the electric equivalent of more MOS transistors connected with each others in parallel) are driven by means of a control circuitry 1. The transistors M1 and M2 may be discrete components or may be integrated in the same chip with the control circuitry 1. The current flowing between the drain and source terminals of the transistor M2 is detected by means of a detecting device 2 that preferably comprises an amplifier able to convert the voltage drop between the terminals of the transistor M2 into a proportional current signal Ifb. The detected current Ifb is in input at the inverting terminal of an error operational amplifier 3 having the non-inverting terminal connected with a reference voltage Vprog (for example of about 1.5 V) and the output terminal connected with an impedance Z the other terminal of which is connected with the inverting terminal of the amplifier 3. The detected current Ifb is brought to the output terminal of the regulator by means of a resistor Rfb arranged between the inverting terminal of the amplifier 3 and the output terminal of the regulator. In accordance with the variations of the current required from the load the current Ifb changes proportionally by causing a well precise and desired variation of the regulated voltage. The variation of the on resistance Rdson2 of the MOS transistor M2 in a way depending on the temperature determines however an undesired variation of the provided current Ifb that in turn determines an undesired variation of the output voltage Vout of the regulator. In fact it occurs that Vout=Vprog−Rfb*Ifb wherein the current Ifb is given by Ifb=Iout*Rdson2/K where K is a proportionality constant that is function of the current detecting device 2 and Iout is the current flowing between the drain and source terminals of the transistor M2. It occurs $$Vout = Vprog - Rfb * \frac{Rdson2}{K} * Iout$$

Figure 2:
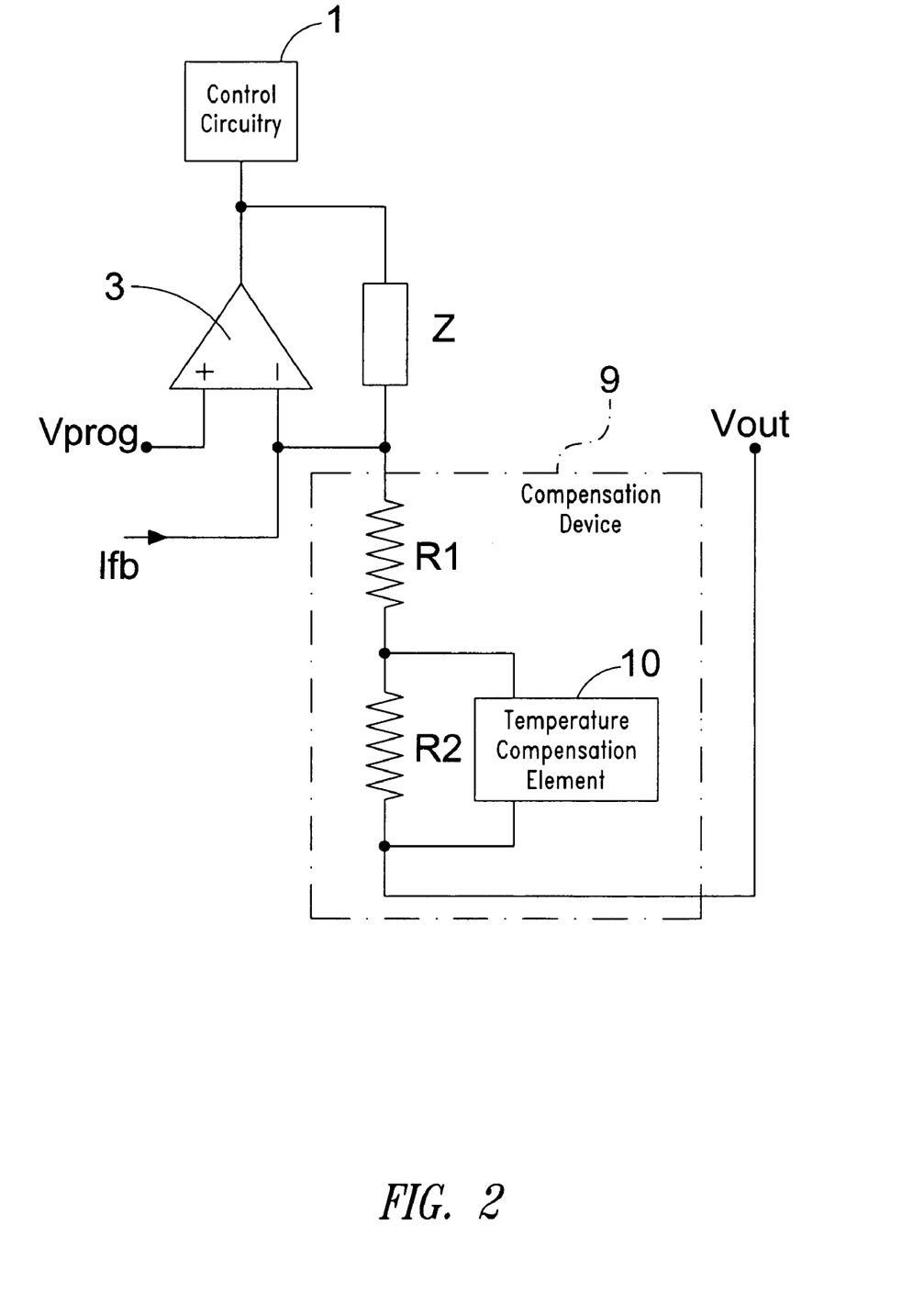
FIG. 2 is a scheme of a circuit part of a switching regulator according to invention.

FIG. 2 shows one embodiment of the present invention. This embodiment has the advantage of avoiding variations of the regulated voltage Vout. The temperature coefficient of the term Rfb*Rdson2/K is cancelled and this is possible by using a thermal compensation device 9. The device 9, shown in FIG. 2, comprises preferably an element 10 having a dependence on the temperature with a negative coefficient, as shown in FIG. 2; in such way the total temperature coefficient may be minimized or even cancelled. A device comprising for example a series of two resistors R1 and R2 may be introduced in the place of the resistor Rfb; said element 10 is set in parallel to the resistor R2. Said element 10 is preferably constituted by a resistor NTC but it may be constituted by a diode having a suitable interface circuitry.

The thermal compensation device 9 may be formed in another way, for example using a MOS transistor and a suitable circuitry or even any bipolar transistor or JFET which is connected always with a suitable circuitry. Any component sensitive to the temperature may be used with a suitable interface circuitry for compensating the variation of the Rdson of the MOS transistor M2. The advantage of using MOS transistors or diodes as element 10 is due to integrability thereof directly on chip of the power transistor at the terminals of which the detection is effectuated.

Figure 3:
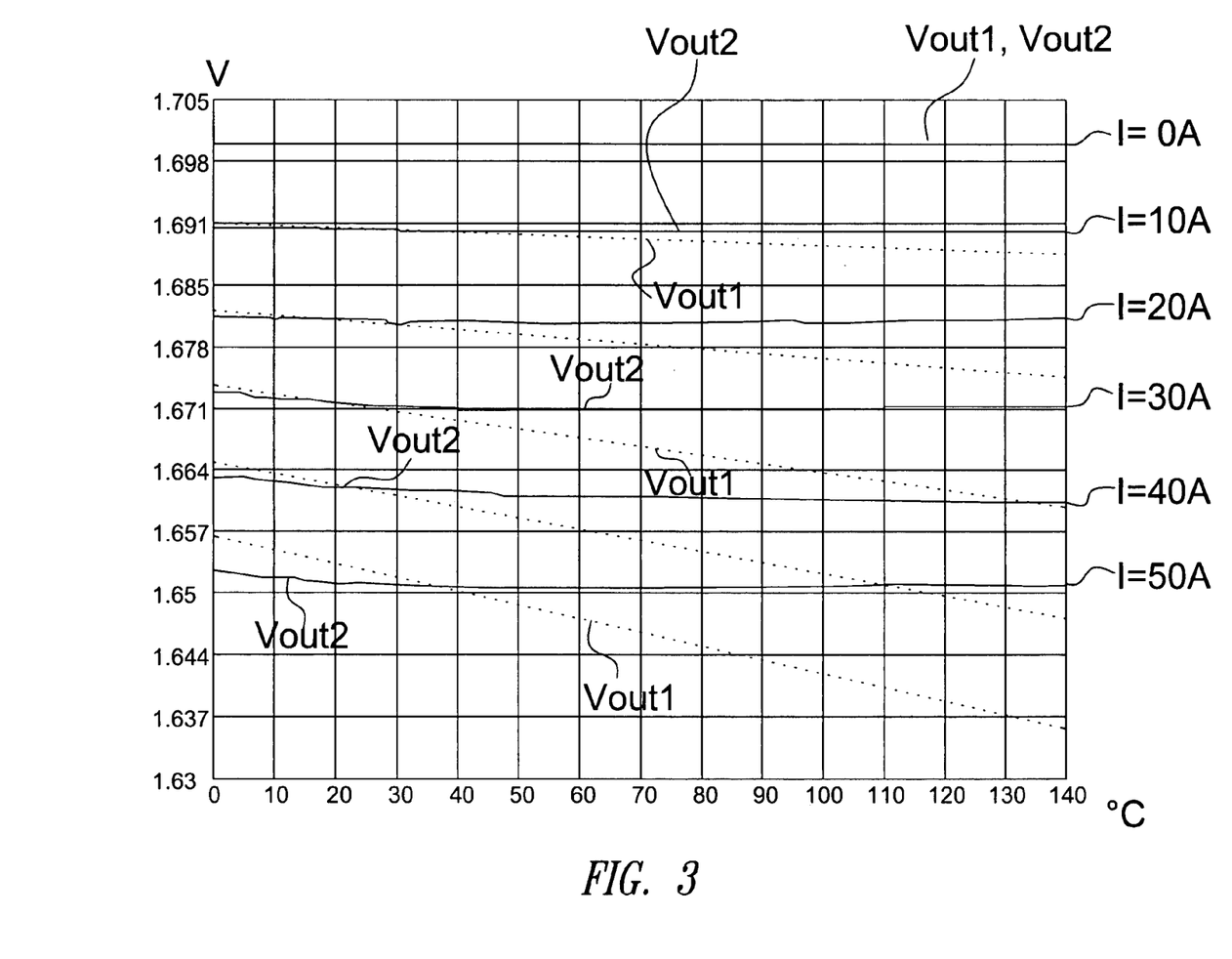
FIG. 3 is a diagram of the output voltages of the circuit in FIG. 1 and of the regulator comprising the circuit part in FIG. 2 as functions of the temperature.

In FIG. 3 the waveforms of the output voltages Vout1 (with a sketch line) and Vout2 (with a continuous line) as functions of the temperature are shown which respectively regard the voltage regulator in FIG. 1 and the regulator employing the thermal compensation device according to invention. The voltages Vout1 and Vout2 are valued in the different cases wherein the value of the current Iout (in FIG. 3 Iout=I) is 0 A, 10 A, 20 A, 30 A, 40 A, 50 A; using I=0 A the voltages Vout1 and Vout2 are equal. The used element NTC is a PANASONIC ERTJ1VT102H. From the diagram it is evident that the voltage Vout is substantially constant changing the temperature.

Figure 4:
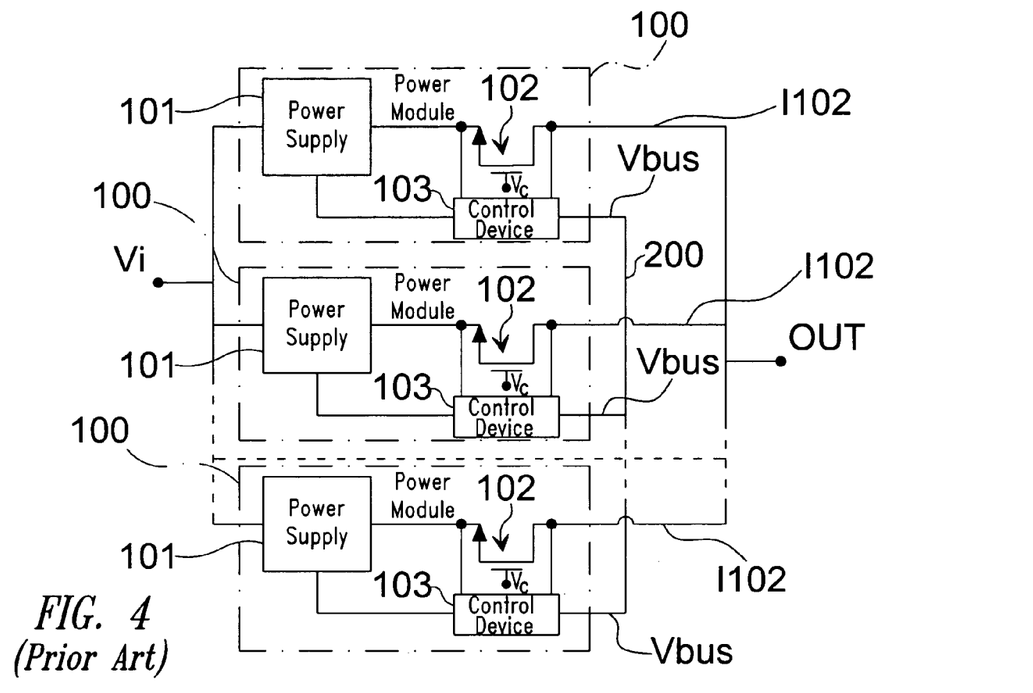
FIG. 4 is a circuit scheme of a modular power supplier according to prior art.

In FIG. 4 a modular power supply is shown according to prior art. Said power supply comprises various modules 100 arranged in parallel to each other and which have a same input voltage Vi. Each module 100 comprises a supply 101, a MOS transistor 102 (which may constitute even the electric equivalent of more MOS transistors connected with each other in parallel) connected in series with the power supply 101 and with the output terminal OUT of the modular power supply and a control circuit 103. The last detects the current I102 flowing through the transistor 102 and provides an input signal to the supply 101 and a signal Vbus which finds on the bus 200 (current-sharing BUS) that is common to all the modules 100 and on which the information relating to the average current brought by the modular power supply is formed wherein it is meant by average current the mean of the currents brought by each module 100. Each module 100 compares the own current with the average current and amends its operation to cancel such difference.

Figure 5:
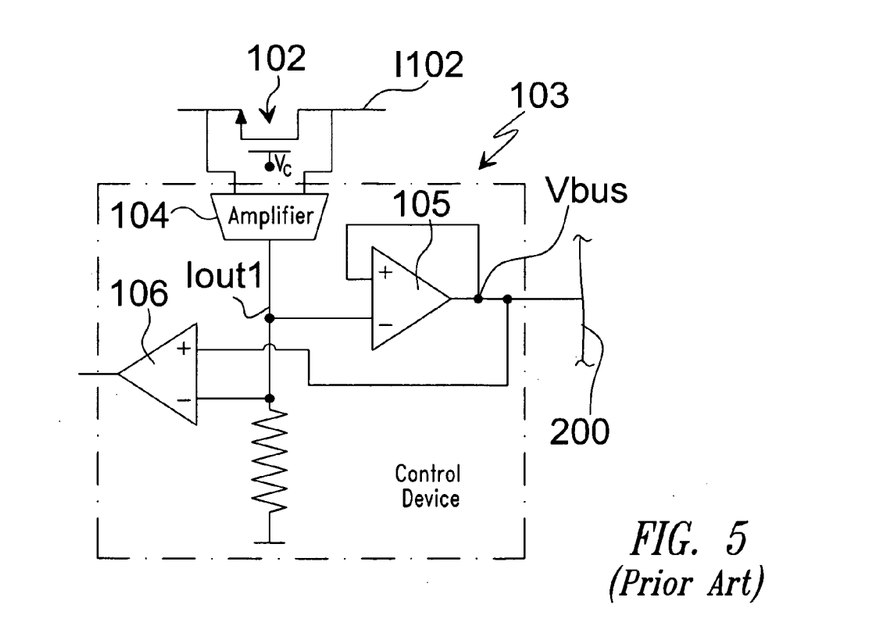
FIG. 5 is a more detailed scheme of a circuit part of a module of the power supplier in FIG. 4.

One embodiment of the control device 103, shown in FIG. 5, comprises an amplifier 104 adapted for detecting the current I102 flowing through the MOS transistor 102, a buffer 105 having an input voltage signal at the inverting terminal which is given by the current signal Iout1 in output from the amplifier 104 which is multiplied by a resistor Rcga and the output signal thereof is in input to a current-sharing BUS 200. The control device 103 comprises an error amplifier 106 having in input the same voltage signal given by the current signal Iout1 in output from the amplifier 104 which is multiplied by a resistor Rcga and a signal storing the information relating to the average current deriving from the current-sharing BUS 200. The output signal of the amplifier 106 is in input to the power supply 101 and it is a correction signal; said signal allows to correct the operation of each power supply 101 in such a way to make equal the current I102 of each module 100 with the average current brought totally by the modular power supply.

The voltage Vbus for each single module 100 is given by:

$$Vbus = Rcga * \frac{Rdson}{k1} * Iout1.$$

Figure 6:
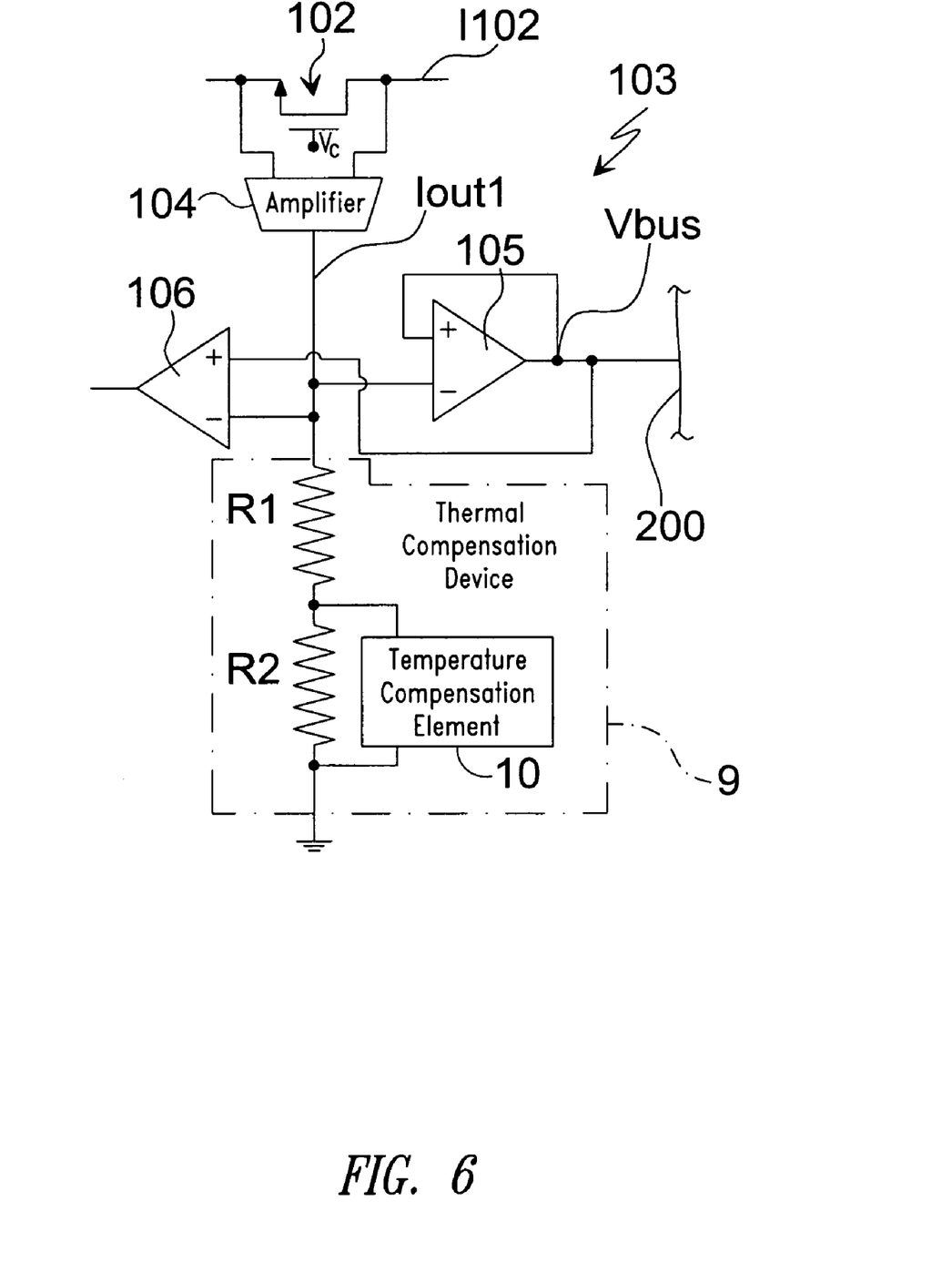
FIG. 6 is a scheme of a circuit part of a module according to the present invention.

FIG. 6 shows the inventive circuit used to avoid variation of the voltage Vcbus with respect to the temperature. The temperature coefficient of the term Rcga*Rdson/K1 is cancelled; this is possible by using a thermal compensation device 9 already described. The device 9 comprises preferably an element 10 having a dependence on the temperature with a negative coefficient, as shown in FIG. 6; in such way the total temperature coefficient may be cancelled. A device comprising for example a series of two resistors R1 and R2 may be introduced in the place of the resistor Rcga; said element 10 is set in parallel to the resistor R2. Said element 10 is preferably constituted by a resistor NTC but it may be constituted by a diode having a suitable interface circuitry.

The thermal compensation device 9 may be formed in another way, for example using a MOS transistor and a suitable circuitry or even any bipolar transistor or JFET which is connected always with a suitable circuitry. Any component sensitive to the temperature may be used with a suitable interface circuitry for compensating the variation of the Rdson of the MOS transistor 102.

Figure 7:
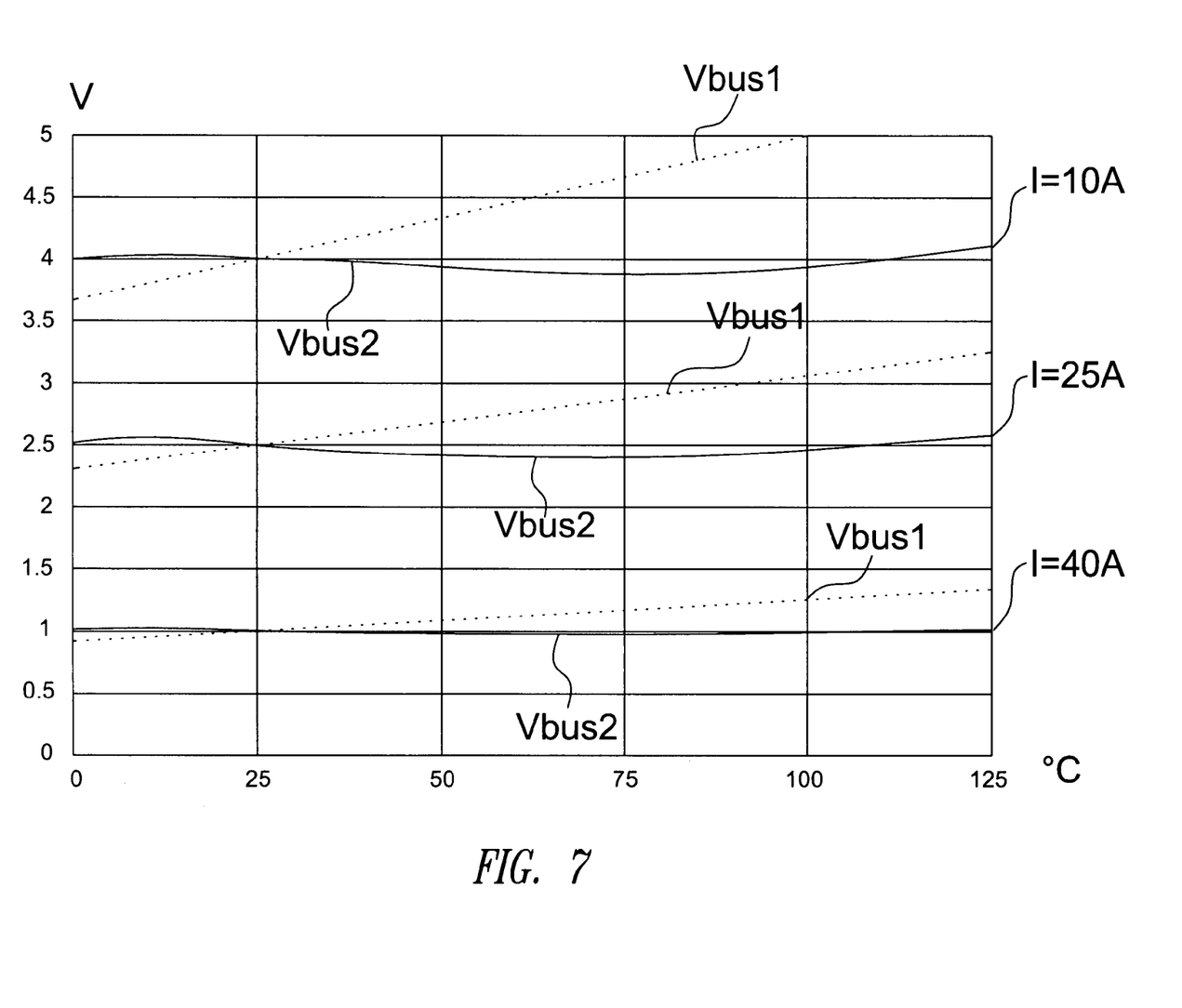
FIG. 7 is a diagram of the average current of the power supplier in FIG. 5 and of a modular power supplier employing the circuit part in FIG. 6 in each module as functions of the temperature.
Figure 8:
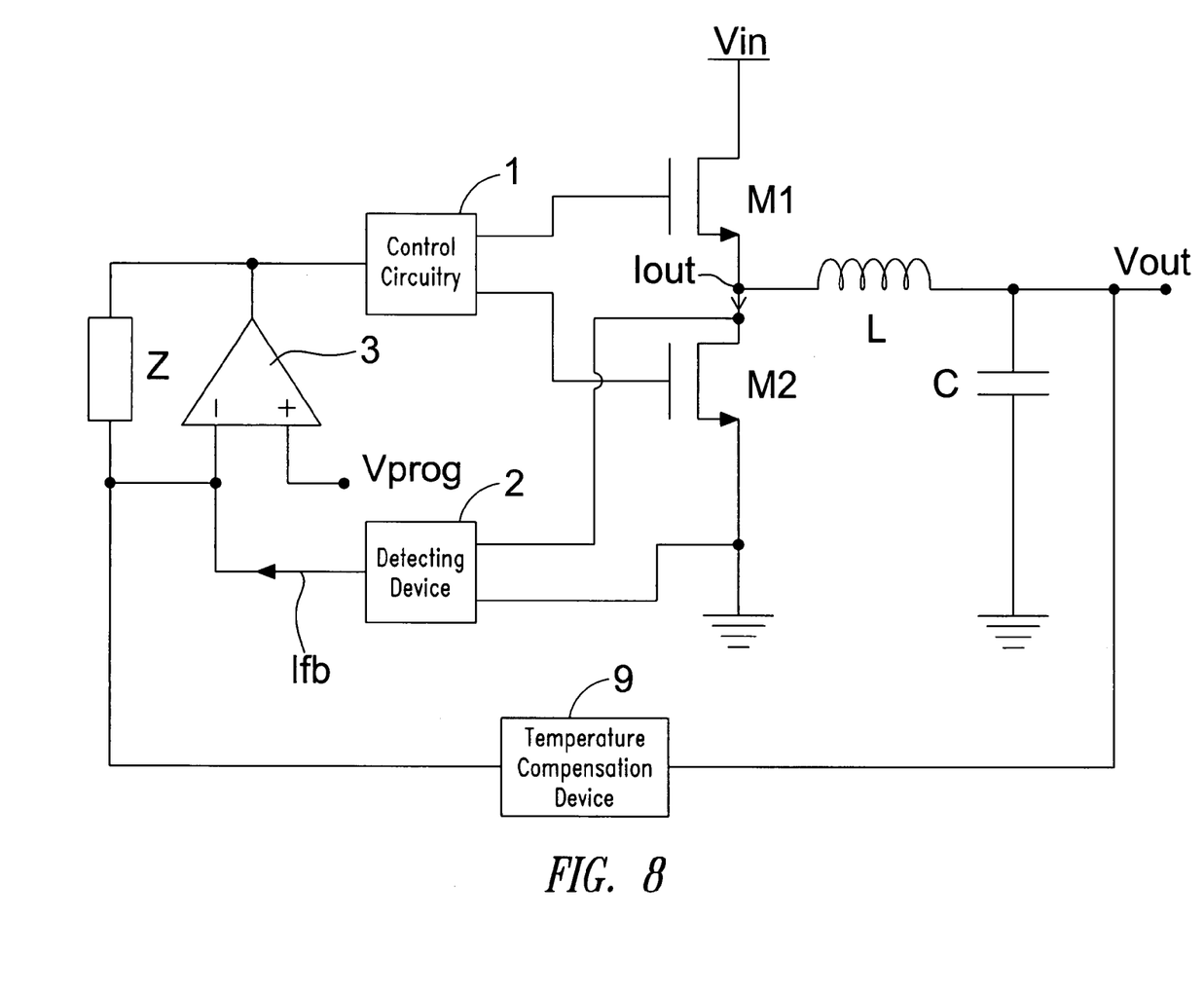
FIG. 8 is a simplified circuit scheme of a switching regulator according to one embodiment of the invention.
Figure 9:
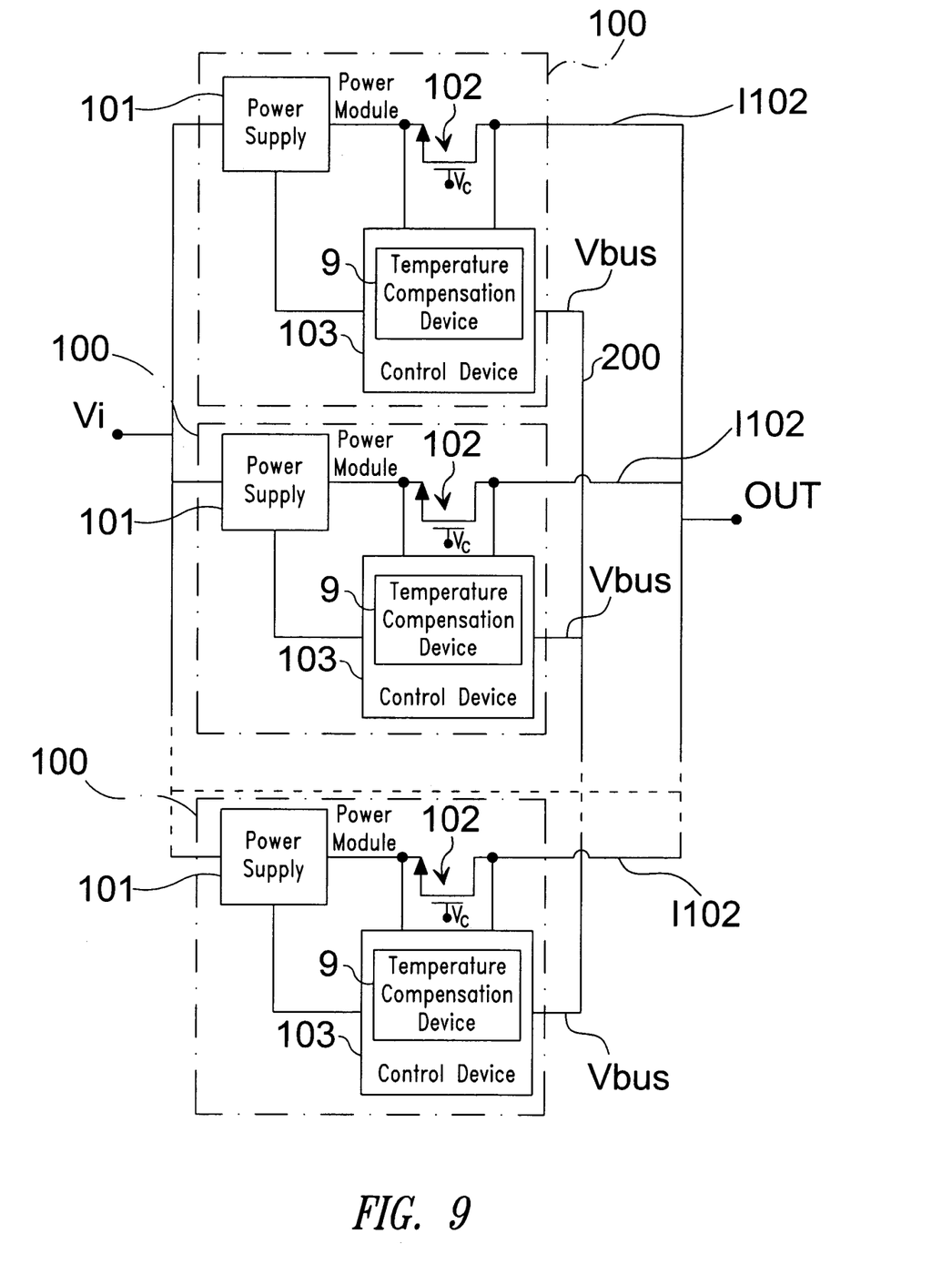
FIG. 9 is a simplified circuit scheme of power supply modular system according to one embodiment of the invention.

In FIG. 7 the waveforms of the output voltages Vbus1 (with a sketch line) and Vbus2 (with a continuous line) on the bus 200 as function of the temperature are shown which respectively regard the power supply in FIG. 4 and the power supply employing the thermal compensation device according to invention. The voltages Vbus1 and Vbus2 are valued in the different cases wherein the value of the current I102 (in FIG. 7 I102=I) is 10 A, 25 A, 40 A. The element NTC used is a PANASONIC ERTJ1VT102H. From the diagram it is evident that the voltage Vbus2 is substantially constant changing the temperature.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A switching voltage regulator adapted for providing a regulated voltage at an output terminal, comprising:
   a MOS transistor having a non-drivable terminal coupled with said output terminal; and
   a control circuit receiving a signal that is representative of the current signal flowing in said MOS transistor, said control circuit having a compensation device adapted for cancelling the thermal variation of said signal that is representative of the current signal flowing in said MOS transistor, wherein said compensation device comprises an element having a negative temperature coefficient.

2. The regulator according to claim 1 wherein said compensation device comprises a first and a second resistors connected in series, said negative temperature coefficient element being arranged in parallel to said first or second resistor.

3. The regulator according to claim 2 wherein said negative temperature coefficient element is a NTC resistor.

4. The regulator according to claim 2 wherein said negative temperature coefficient element is a diode.

5. The regulator according to claim 1 wherein said MOS transistor is a MOS power transistor having a non-drivable terminal coupled with an input voltage, and said control circuit comprises a driving device of said MOS power transistor which is coupled with its gate terminal, a first device which is adapted for detecting the current flowing through said MOS power transistor and which is able to provide at an output terminal said signal that is representative of the current signal flowing in said MOS transistor, a second device which is coupled with said first device and which is able to compare said signal in output from said first device with a reference signal and which is able to provide a correction signal to the driving device, said compensation device being coupled with the output terminal of the first device and with the output terminal of said voltage regulator.

6. The regulator according to claim 5 wherein said second device is an error amplifier having the input inverting terminal connected with the output terminal of the first device and with the compensation device.

7. The regulator according to claim 6 wherein said first device comprises a transconductance amplifier.

8. A power supply modular system comprising:
   two single switching regulators arranged in parallel to each other, each of said regulators being adapted for providing a regulated voltage at an output terminal, each of said regulators comprising at least one MOS transistor having a non-drivable terminal coupled with said output terminal; and
   a control circuit receiving a signal that is representative of the current signal flowing in said MOS transistor, said control circuit having a compensation device adapted for cancelling the thermal variation of said signal that is representative of the current signal flowing in said MOS transistor, wherein said compensation device comprises an element having a negative temperature coefficient.

9. The system according to claim 8 wherein said compensation device comprises a first and a second resistors connected in series, said negative temperature coefficient element being arranged in parallel to said first or second resistor.

10. The system according to claim 8 wherein said negative temperature coefficient element is a NTC resistor.

11. The system according to claim 8 wherein said negative temperature coefficient element is a diode.

12. The system according to claim 8 wherein said two switching regulators have a common input voltage, each one of said regulators comprising supply means coupled with said MOS transistor connected in turn with an output terminal of said modular system, and said control circuit is coupled with the MOS transistor, with said supply means and with a bus which is common to all said at the least two switching regulators and which is adapted for bringing the information of the average current brought totally by said system, said control circuit comprising a first device which is adapted for detecting said current flowing between the drain and source terminals of said MOS transistor and which is able to provide at an output terminal said signal that is representative of the said current, said compensation device being coupled with said first device in order to provide in output a compensated signal, said control circuit comprising first means able to provide a signal representative of the compensated signal to said bus and second means able to provide a correction signal to said supply means in order the current signal of each regulator to make equal to said average current.

13. The system according to claim 12 wherein said first means comprises a buffer having in input said compensated signal and said second means comprises an error amplifier having said compensated signal at the inverting terminal and a signal representative of said average current coming from said bus at the non-inverting terminal.

14. A switching voltage regulator for providing a regulated voltage at an output terminal, comprising:
   a MOS power transistor having a first conduction terminal coupled with said output terminal and a second conduction terminal coupled with an input voltage; and
   a control circuit receiving a signal that is representative of a current flowing in said MOS transistor, said control circuit including:
      a compensation device structured to cancel a thermal variation of said signal that is representative of the current flowing in said MOS transistor;
      a driving device coupled to a gate terminal of said MOS power transistor;
      a first device structured to detect the current flowing through said MOS power transistor and provide at an output terminal said signal that is representative of the current flowing in said MOS transistor; and a second device coupled with said first device and structured to compare said signal from said first device with a reference signal and provide a correction signal to the driving device, said compensation device being coupled with the output terminal of the first device and with the output terminal of said voltage regulator, wherein said second device is an error amplifier having an input inverting terminal connected with the output terminal of the first device and with the compensation device, wherein said first device includes a transconductance amplifier.

15. The regulator according to claim 14 wherein said compensation device comprises first and second resistors connected in series, said negative temperature coefficient element being arranged in parallel to said first or second resistor.

16. The regulator according to claim 14 wherein said negative temperature coefficient element is an NTC resistor.

17. The regulator according to claim 14 wherein said negative temperature coefficient element is a diode.

18. A power supply modular system, comprising:

two switching regulators arranged in parallel to each other, each of said regulators being structured to provide a regulated voltage at an output terminal, each of said regulators including a MOS transistor having a conduction terminal coupled with said output terminal, wherein said two switching regulators have a common input voltage, each of said regulators including supply means coupled with said MOS transistor connected in turn with an output terminal of said modular system;

a bus common to the two switching regulators and structured to bring information of an average current brought totally by said modular system; and a control circuit receiving a signal that is representative of a current flowing in said MOS transistor, said control circuit being coupled with the MOS transistor, with said supply means, and with the bus, said control circuit including:

a compensation device structured to cancel a thermal variation of said signal that is representative of the current flowing in said MOS transistor;

a first device structured to detect said current flowing in said MOS transistor and provide at an output terminal said signal that is representative of said current, said compensation device being coupled with said first device in order to provide in output a compensated signal;

first means for providing a signal representative of the compensated signal to said bus; and second means for providing a correction signal to said supply means in order to make the current of each regulator equal to said average current.

19. The system according to claim 18 wherein said first means comprises a buffer having in input said compensated signal and said second means comprises an error amplifier having said compensated signal at an inverting terminal and a signal representative of said average current coming from said bus at a non-inverting terminal.

* * * * *